United States Patent [19]

Parthasarathy

[11] Patent Number: 4,933,815
[45] Date of Patent: Jun. 12, 1990

[54] LIGHT PIPE FOR DECORATIVE ILLUMINATION

[76] Inventor: Mellapalayam R. Parthasarathy, 32532 Jean Dr., Union City, Calif. 94587

[21] Appl. No.: 269,880

[22] Filed: Nov. 10, 1988

[51] Int. Cl.$^5$ ................................................. F21Y 8/00
[52] U.S. Cl. ..................................... 362/32; 350/96.34
[58] Field of Search ............... 362/32; 350/96.1, 96.34

[56] References Cited

U.S. PATENT DOCUMENTS 4,488,773 12/1984 Wagner ............................. 350/96.29
4,629,285 12/1986 Carter et al. ...................... 350/96.23
4,682,851 7/1987 Ansel ................................. 350/96.34
4,784,458 11/1988 Horowitz et al. ................. 350/96.21
4,844,604 7/1989 Bishop et al. ..................... 350/96.34

Primary Examiner—Ira S. Lazarus
Assistant Examiner—Richard R. Cole
Attorney, Agent, or Firm—Flehr, Hohbach, Test, Albritton & Herbert

[57] ABSTRACT

An improved optical light pipe for decorative illumination which accepts high intensity light at the ends of the light pipe, which refracts predominantly all of the propagating modes radially outwards of the light pipe and which has a central member for mechanical strength and mode scattering.

11 Claims, 3 Drawing Sheets

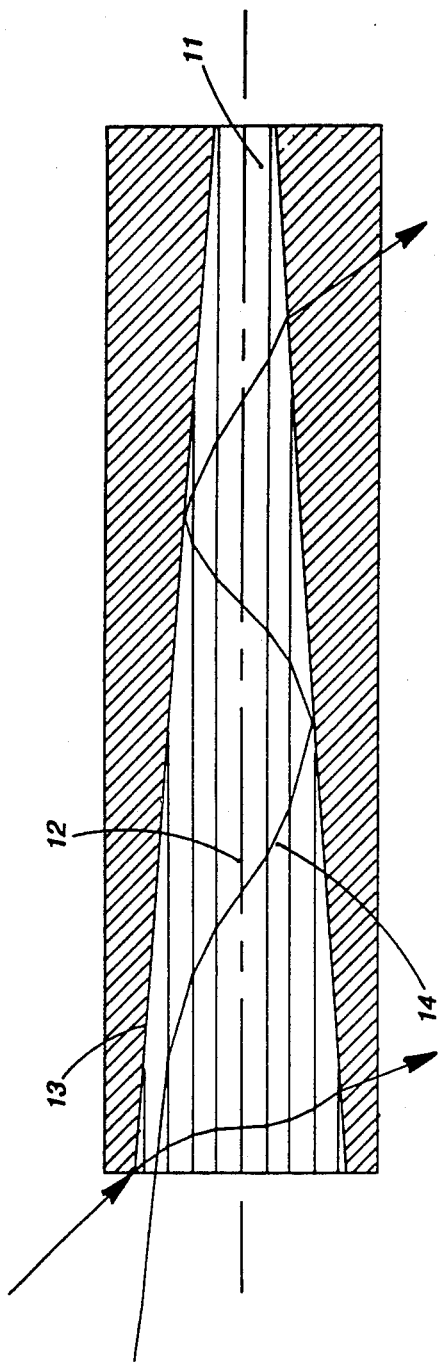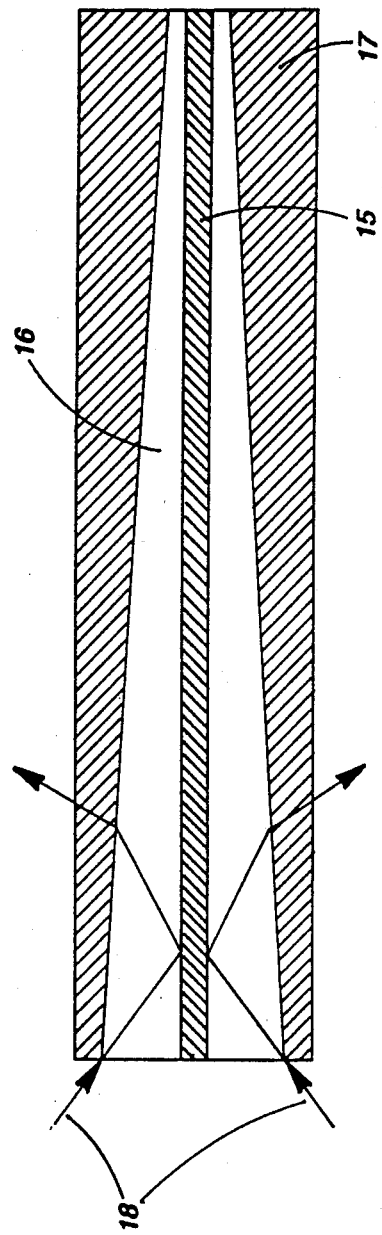

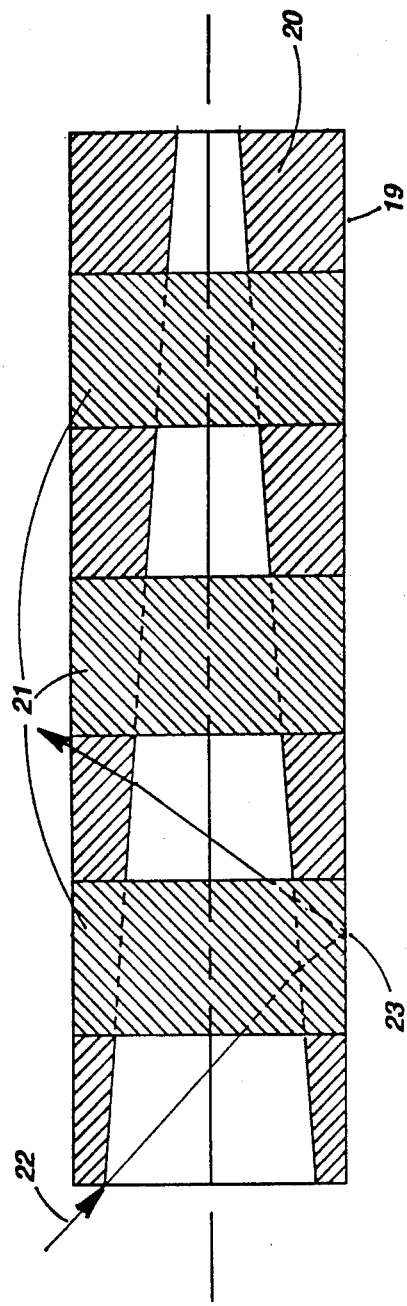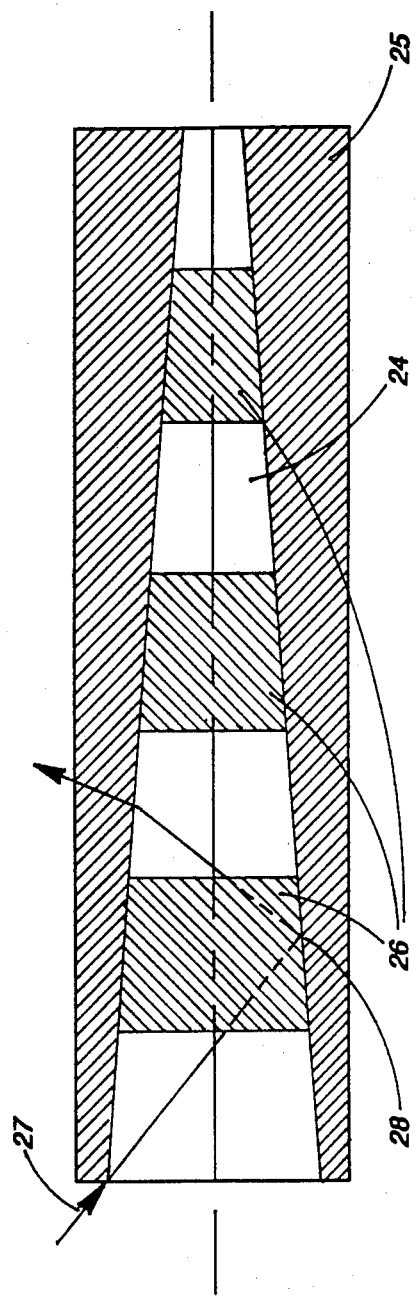

LIGHT PIPE FOR DECORATIVE ILLUMINATION

BACKGROUND

1. Field Of Invention

This invention relates to an improved lighting device for use around swimming pools, walkways, signs and other decorative accent lighting.

2. Description Of Prior Art

Illumination by means of radiation from the surface of an elongated substrate such as a rod or fiber finds wide application in area lighting, around swimming pools, walkways, signs, safety and decorative accent lighting. In such lighting systems, light energy is directed at one or both ends of the fiber whereupon portions of the light propagates through the core of the fiber and portions are scattered laterally by controlled apparatus. The controlled conversion of the axial component of light energy travelling through the core of the fiber into lateral modes results in emission of light from the outer surface of the fiber.

Optical fiber lighting apparatus available in the market today primarily employ two techniques for scattering the propagating light within the fiber into lateral modes for illumination. The surface of the core layer of such fibers are roughened to approximately 0.3 microns to scatter the light rays impinging the core/clad interface. Portions of the scattered light escape from the fiber and are radiated out of the fiber surface. A second technique uses radiation scattering centers dispersed within the core itself to scatter propagating light outwards so that they emerge from the outer surface of the fiber. The core dimensions are predominantly uniform throughout the entire length of the fiber. These arrangements do not permit efficient conversion of light energy incident at the end(s) of the fiber into laterally scattered energy for illumination purposes. Conventional illumination fibers therefore provide only low intensity lateral illumination.

The core of conventional illumination fibers are formed of extruded thermoplastics. Thermoplastics have low softening temperatures and therefore restrict the amount of radiant energy that can be incident at the end face(s). High light intensities result in high heat generation within the plastic core due to absorption and the heat build up may reach the critical softening temperatures of thermoplastics.

Conventional all-plastic fibers do not exhibit rigidity and therefore they require trays and channels for support. In certain applications rigidity and strength are important so that forming individual strands of the fiber into intricate shapes can be performed without the fiber damaging or abrading. Rigidity also enables the fiber to be self-supporting. Conventional illumination fibers do not have features that allow this capability.

SUMMARY OF THE INVENTION

It is the primary object of this invention to provide an elongated illumination device:

that allows controlled and efficient conversion of propagating light modes into laterally refracted light for illumination.

that allows high intensity light energy to be incident at the end(s) of the fiber without softening of the core or the cladding material.

that allows bending and forming the same with ease and without the risk of breaks or surface abrasion, that is self supporting without the need for channels and/or trays for support.

BRIEF DESCRIPTION OF DRAWINGS

FIG. 3 shows a light pipe according to another embodiment of this invention.

FIG. 4 shows a light pipe according to another embodiment of this invention.

FIG. 5 shows a light pipe according to another embodiment of this invention.

FIG. 6 shows a light pipe according to another embodiment of this invention.

DESCRIPTION OF THE PREFERRED EMBODIMENTS

Figure 1:
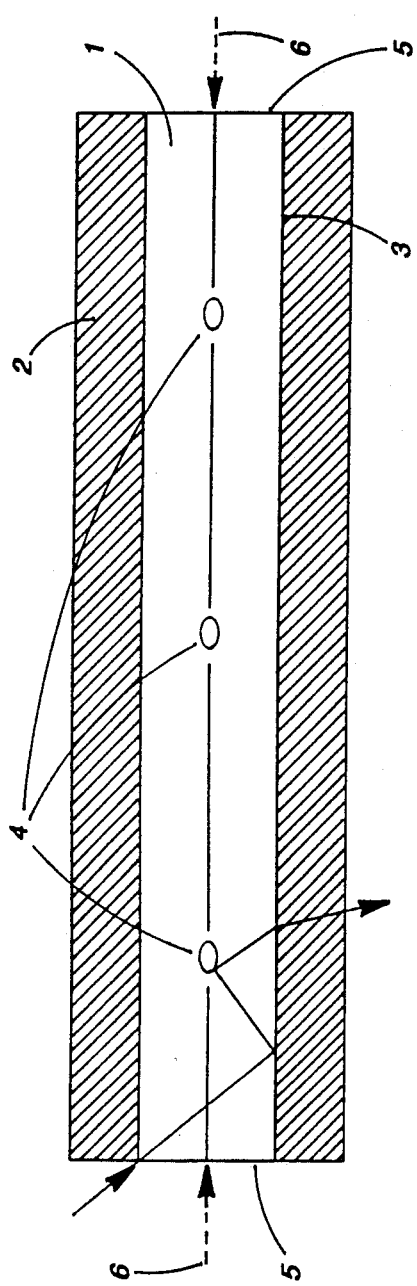
FIG. 1 shows a conventional lighting device.

Referring to FIG. 1, the core 1 of the conventional lighting fiber is typically 400 to 1000 microns and is extruded or otherwise formed of a thermoplastic material. The cladding 2 (hereinafter sometimes referred to as "clad") is formed of a different material, typically Teflon brand. The boundary 3 between the core 1 and the clad 2 may include surface irregularities of the order of 0.3 to 3 microns to enhance lateral scattering of the incident light flux. The fiber core 1 may also include scattering centers 4 to scatter the light within the core and therefore aid in mixing the modes within the core. In conventional fibers having such core scattering centers, the incident light 6 which is directed on the end face(s) 5, travels along the core 1 and upon hitting the scattering centers 4, gets refracted outwards and ultimately diffuses out through the clad. Conventional fibers having core surface irregularities, have to rely on other means of supplying high order modes to the core/clad interface. Once modes hit the irregular interface, they get scattered with portions scattering outwards and portions refracting back into the cladding layer 2. Without other means of mode mixing within the core, core surface roughness in itself is not efficient in converting propagating core light into lateral modes for surface illumination.

The low softening temperature of the thermoplastic core material restricts the energy level that can be incident at the fiber face(s). High intensities generate high material temperatures due to absorption of part of the radiant energy with the temperature sometimes reaching the critical softening point of the material. The uniform cross-sectional area of the core 1 does not permit a uniform and controlled conversion of low order modes to scattering modes for lateral diffusion of light flux for illumination. The all-plastic construction also renders the fiber light-guide weak with low tensile and bending strength.

Figure 2:
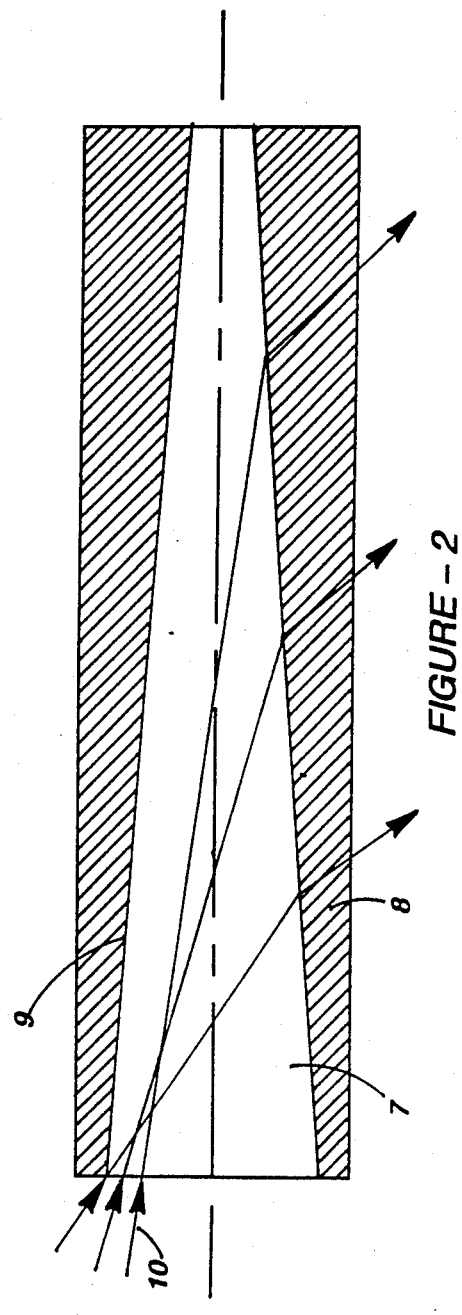
FIG. 2 shows a light pipe according to one embodiment of this invention.

FIG. 2 shows a light pipe according to the preferred embodiment of this invention. The core 7 is made up of material with a selected refractive index while the cladding 8 is made up of material with a different refractive index (which as is well known in optical physics is usually lower than the index of refraction of the core 7). The diameter of the core 9 is gradually reducing in the direction of the light flux. The reducing diameter enables a gradual change in the angle of incidence of the propagating modes of light at the core/clad interface in the direction of light propagation. This enables efficient and controlled lateral light diffusion along the entire light pipe length for illumination. Of course, the reduction in core diameter need not be uniform. It could be in alternating sections of uniform and tapering dimensions to provide brighter illumination at preferred locations along the length of the light pipe. The cladding 8 may be either tapered or uniform in its outer dimensions. In this preferred embodiment, the incident light 10 travels along the core 7 whereupon the high order modes impinging the core/clad interface at a given point will refract outwards and ultimately emerge from the outer surface of the cladding.

FIG. 3 shows a light pipe according to another embodiment of this invention. In this preferred embodiment, the core 11 consists of multiple layers of varying refractive indices with a high refractive index towards the center 12 and a gradually decreasing refractive index outwards 13. The number of core layers reduces in the direction of light propagation. The reduction in the number of layers commences from the outermost low refractive index layers and results in a gradual reduction in the effective diameter of the core along the length of the light pipe. This configuration enables the uninterrupted propagation of low order modes along the light pipe and makes them available for lateral scattering at the downstream end of the light pipe.

FIG. 4 shows a light pipe according to another embodiment of this invention. In this preferred embodiment, the light pipe consists of a central continuous member 15 for strength and mode reflection within the core medium, a core medium 16 of selected refractive index and a cladding medium 17 of different refractive index to transmit the laterally diffused light to the outside of the light pipe. The surface of the central member 15 may be highly polished and may be formed of ceramic or metal. Incident light 18 propagating through the core 16 reflects off the surface of the central member 15. The resulting high order modes get refracted laterally at the core/clad interface and ultimately get diffused outwards from the cladding surface. The central member also serves as a means of improving the tensile and bending strength of the light pipe. A malleable central member will also aid in forming the light pipe into intricate self-supporting patterns without the need for trays or channels to house the same.

FIG. 5 shows a light pipe according to another embodiment of this invention. In this preferred embodiment, selected areas of the surface 19 of the cladding 20 of the light pipe is masked to produce alternating dark (non-illuminated) and bright (illuminated) sections along the length of the light pipe. The masks 21 may consist of, but not confined to, metal, plastic or ceramic that have preferably highly polished inner surface (surface facing the core). The mask 21 may be formed on the light pipe from sheets of the material or applied by spraying in liquid or solid powder form and then set in place. Referring to FIG. 5, the high order mode 22 travelling through the core gets refracted into the cladding layer, inpinges on the mask surface 23 and refracts back into the core through the cladding whereupon it emerges, by refraction through the unmasked portion of the fiber, on the other side of the light pipe.

FIG. 6 shows a variation of this concept wherein the masks 26 are on the surface of the core 24. The cladding layer 25 is formed directly over the partially masked core layer 24. Referring to FIG. 6, incident ray 27 hits the surface of the mask 28 and is reflected back into the core thereby producing a dark (non-illuminated) area immediately outside the masked area. Such light pipes will find use in decorative applications such as Christmas tree lights.

In another preferred embodiment of this invention, the core (7 of FIG. 2) is formed with an ultraviolet curable polymer material. The core 7, alternatively, could be made of photopolymerized plastic material. The cladding (8 of FIG. 2) may also be formed of an ultraviolet curable material of different refractive index. And, alternatively, the cladding 8 may be made of a photo-polymerized plastic material (a class of material including ultraviolet curable material, as is well known in the art). The ultraviolet cured material is highly cross-linked through a photo-polymerization process and possesses high heat and abrasion resistance. The choice of ultraviolet curable materials for the core and cladding of illumination light pipes therefore allow incidence of high intensity light. Having taught the use of photo-polymerized plastic material in a tapered core light pipe (FIG. 2), producing a uniform core light pipe of photo-polymerized plastic material is well known.

It should further be apparent to those skilled in the art that various changes in form and details of the invention as shown and described may be made. It is intended that such changes be included within the spirit and scope of the claims appended hereto.

I claim:

1. A fiber optic light guide, comprising:
   a core for propagating incident light along its length; and
   a cladding surrounding said core for selectively refracting light modes outward from said core and cladding for illumination from the outer surface of said cladding;
   at least one of said core and said cladding being from the class of photo-polymerized plastic material.

2. A light pipe for decorative illumination comprising:
   a core layer for propagating incident light along its length, and
   a cladding layer for selectively refracting light modes outwards from said core and cladding for illumination from the outer surface of said cladding,
   said core is formed of photo-polymerized plastic.

3. The light pipe of claim 2 wherein said cladding is selected from the class of photo-polymerized plastic material.

4. The light pipe of claim 3 wherein said core is formed of an ultraviolet curable polymer material.

5. The light pipe of claim 3 wherein said cladding is formed of an ultraviolet curable polymer material.

6. A light pipe for decorative illumination comprising:
   a core layer for propagating incident light along its length,
   a cladding layer for selectively refracting light modes outwards for illumination from the outer surface of said cladding;
   said cladding is formed of photo-polymerized plastic material.

7. The light pipe of claim 6 wherein said core is selected from the class of photo-polymerized plastic material.

8. The light pipe of claim 7 wherein said core is formed of an ultraviolet curable polymer material.

9. The light pipe of claim 7 wherein said cladding is formed of an ultraviolet curable polymer material.

10. A fiber optic light guide comprising:

a core for propagating incident light along its length wherein said core has an index of refraction of a first value and is selected from the class of photo-polymerized plastic material; and a cladding surrounding said core for selectively refracting light modes outward from said core and cladding for illumination from the outer surface of said cladding wherein said cladding has an index of refraction of a second value less than said first value and is selected from the class of photo-polymerized plastic material.

11. The fiber optic light guide of claim 10 wherein said class of photo-polymerized plastic material includes ultraviolet curable polymer material.

* * * * *